United States Patent
Norman et al.

(10) Patent No.: US 9,359,941 B2
(45) Date of Patent: Jun. 7, 2016

(54) METHOD FOR PURGING CONDENSATE FROM A CHARGE AIR COOLER

(71) Applicant: Ford Global Technologies, LLC, Dearborn, MI (US)

(72) Inventors: Kristofor Robert Norman, Canton, MI (US); Shuya Shark Yamada, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 527 days.

(21) Appl. No.: 13/654,290

(22) Filed: Oct. 17, 2012

(65) Prior Publication Data

US 2014/0102424 A1    Apr. 17, 2014

(51) Int. Cl.
*F02B 29/04* (2006.01)
*F02B 37/16* (2006.01)

(52) U.S. Cl.
CPC ............... *F02B 37/16* (2013.01); *F02B 29/04* (2013.01); *F02B 29/0468* (2013.01); *Y02T 10/144* (2013.01); *Y02T 10/146* (2013.01)

(58) Field of Classification Search
CPC ............ F02B 29/04; F02B 29/0406; F02B 2029/0487; F02B 29/0493; F02B 29/0425; F02B 29/0437; F02B 37/16; F02B 29/0468
USPC .......................................................... 123/542
See application file for complete search history.

(56) References Cited

U.S. PATENT DOCUMENTS

| 5,791,145 | A | 8/1998 | Freen |
| 6,125,801 | A | 10/2000 | Mendler |
| 8,051,842 | B2 | 11/2011 | Hagelstein et al. |
| 8,136,513 | B2 | 3/2012 | Schiestl et al. |
| 2007/0277792 | A1* | 12/2007 | Durand .......................... 123/563 |
| 2010/0229549 | A1* | 9/2010 | Taylor ............................. 60/599 |
| 2011/0155112 | A1* | 6/2011 | Schiestl et al. ................. 123/672 |

FOREIGN PATENT DOCUMENTS

WO         9953183         10/1999

* cited by examiner

*Primary Examiner* — Lindsay Low
*Assistant Examiner* — Jacob Amick
(74) *Attorney, Agent, or Firm* — Julia Voutyras; Alleman Hall McCoy Russell & Tuttle LLP

(57) ABSTRACT

Embodiments for controlling condensate in a charge air cooler are provided. In one example, a method for a charge air cooler comprises, responsive to a condensate level in the charge air cooler, increasing boost pressure and maintaining a requested level of torque by routing a portion of air flow exiting the charge air cooler to an intake passage upstream of a compressor. In this way, accumulated condensate in the charge air cooler may be removed while maintaining driver-requested torque.

19 Claims, 4 Drawing Sheets

METHOD FOR PURGING CONDENSATE FROM A CHARGE AIR COOLER

FIELD

The present disclosure relates to a charge air cooler.

BACKGROUND AND SUMMARY

Turbocharged and supercharged engines may be configured to compress ambient air entering the engine in order to increase power. Compression of the air may cause an increase in air temperature, thus, a charge air cooler may be utilized to cool the heated air, thereby increasing its density and further increasing the potential power of the engine. Ambient air from outside the vehicle travels across the charge air cooler to cool intake air passing through the inside of the charge air cooler. Condensate may form in the charge air cooler when the ambient air temperature decreases, or during humid or rainy weather conditions, where the intake air is cooled below the water dew point. Condensate may collect at the bottom of the charge air cooler, or in the internal passages, and cooling turbulators. When torque is increased, such as during acceleration, increased mass air flow may strip the condensate from the charge air cooler, drawing it into the engine and increasing the likelihood of engine misfire.

Other attempts to address engine misfire due to condensate ingestion involve avoiding condensate build-up. However, the inventors herein have recognized potential issues with such methods. Specifically, while some methods may reduce or slow condensate formation in the charge air cooler, condensate may still build up over time. If this build-up cannot be stopped, ingestion of the condensate during acceleration may cause engine misfire. Another method to prevent engine misfire due to condensate ingestion includes trapping and/or draining the condensate from the charge air cooler. While this may reduce condensate levels in the charge air cooler, condensate is moved to an alternate location or reservoir, which may be subject to other condensate problems such as freezing and corrosion.

In one example, the issues described above may be addressed by a method for a charge air cooler. The method comprises, responsive to a condensate level in the charge air cooler, increasing boost pressure and maintaining a requested level of torque by routing a portion of air flow exiting the charge air cooler to an intake passage upstream of a compressor.

In this way, a charge air cooler clean-out cycle may periodically purge the condensate from the charge air cooler. The charge air cooler clean-out cycle may be initiated in response to a condensate level in the charge air cooler, which may be estimated based on mass air flow in one example. By increasing air flow through the charge air cooler, controlled amounts of condensate may be blown off into the engine without causing misfire. The increase in air flow through the charge air cooler and resultant torque disturbance that may occur if the air flow were to reach the engine, may be counteracted by routing a portion of the air from the charge air cooler back to the intake passage upstream of the compressor. In this way, the clean-out cycle may not alert the vehicle operator. By performing this clean-out routine, condensate levels in the charge air cooler may be maintained at a low level to prevent engine misfire during normal vehicle operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

During a standard engine drive cycle, engine air flow may be periodically raised for short durations, termed micro tip-ins, due to vehicle traversal of small hills, ambient air flow changes, vehicle acceleration, etc. These micro tip-ins may act to gradually remove condensate that has built up in an engine charge air cooler. However, under certain conditions, such as when the vehicle is driven over a flat surface, the micro tip-ins may not occur frequently enough to adequately remove the accumulated condensate. Thus, if engine air flow remains below a threshold for a given amount of time, a charge air cooler clean-out cycle may be initiated to actively remove the accumulated condensate.

Figure 1:
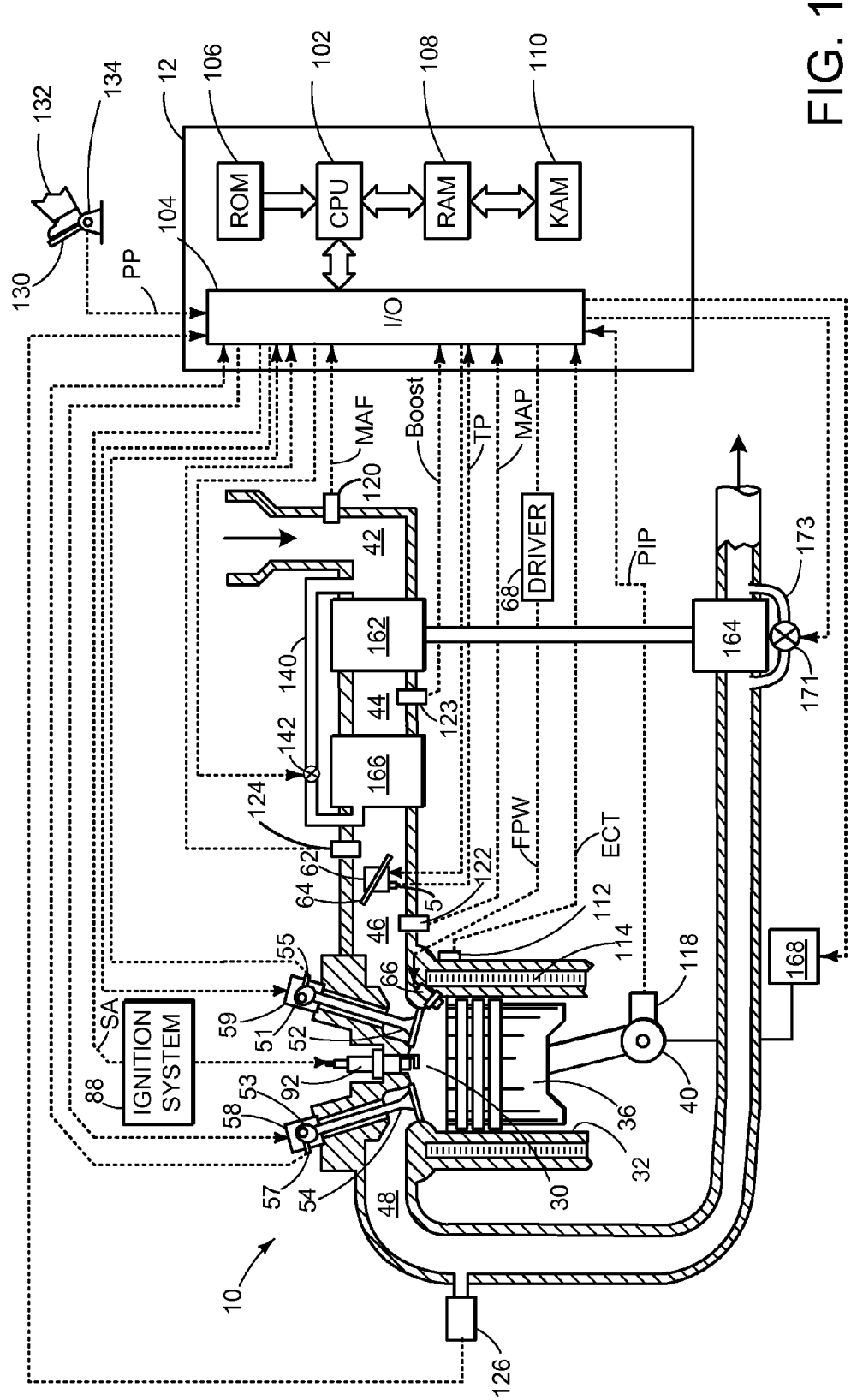
FIG. 1 shows a schematic diagram of an engine including a charge air cooler.

The clean-out cycle may be performed by closing a turbocharger wastegate, thus increasing boost pressure and air flow through the charge air cooler. This increased air flow may gradually remove the condensate from the charge air cooler and direct the condensate to the engine in a controlled manner. To ensure that operator-requested torque is maintained when the air flow is increased, a valve controlling a conduit coupled to the outlet side of the charge air cooler may be opened. The conduit may also be coupled to the engine intake passage upstream of the compressor. Thus, by opening the valve, a portion of the air flow exiting the charge air cooler may be routed back to the intake passage upstream of the compressor. In this way, air flow to the engine may be maintained even as air flow through the charge air cooler is increased. FIG. 1 is a diagram of an engine including a charge air cooler, illustrated in greater detail in FIG. 2, having an outlet fluidically coupled to an engine intake passage upstream of a compressor via a conduit. FIG. 1 also includes a controller configured to carry out the method of FIG. 3.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger wastegate 171 is a valve that allows exhaust gases to bypass turbine 164 via bypass passage 173 when turbocharger wastegate 171 is in an open state. Substantially all exhaust gas passes through turbine 164 when wastegate 171 is in a fully closed position.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC 166, to aid in cooling the charge air. Condensate may form and accumulate in the CAC 166 when the ambient air temperature decreases, or during humid or rainy weather conditions, where the charge air is cooled below the water dew point. When the charge air includes recirculated exhaust gasses (from an exhaust gas recirculation system, not shown in FIG. 1), the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC 166, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Thus, as elaborated herein with reference to FIGS. 2-4, condensate may be purged from the CAC 166 to the engine under controlled conditions. This controlled purging may help to reduce the likelihood of engine misfire events.

In one example, condensate may be proactively purged from the CAC 166 by increasing air flow through the CAC 166 while maintaining air flow to the engine intake to maintain torque demand. To increase air flow through the CAC 166, wastegate 171 may be closed, increasing the boost pressure and hence the amount and/or velocity of air traveling through the charge air cooler. To maintain air flow to the engine even with the increased boost pressure, at least a portion of the air from the CAC 166 may be routed back to the intake upstream of the compressor. For example, a conduit 140 may fluidically couple the outlet of the CAC 166 to the inlet of the compressor 162. A valve 142 positioned in conduit may be opened to route air from the CAC 166 to the compressor 162. Valve 142 may be a suitable valve, actuated pneumatically, hydraulically, electronically, etc. In one example, valve 142 may be an electronic compressor recirculation valve (eCRV), positioned at the outlet of the charge air cooler rather than at the compressor.

The CAC and associated conduits and components shown in FIG. 1 are non-limiting, as other configurations are possible. For example, valve 142 may be positioned in the outlet tank of the CAC rather than in the conduit 140. Further, while conduit 140 is shown in FIG. 1 as being separate from the air outlet of CAC that is coupled to the engine, in some embodiments a single outlet from the CAC may lead to both the engine and the intake passage upstream of the compressor (e.g., an outlet conduit from the CAC may be branched with one branch leading to the engine and the other leading to the intake passage).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a conventional microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 46; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, and other sensors.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

In response to a condensate level in the CAC 166, controller 12 may close wastegate 171, increasing the intake air flow. As elaborated herein at FIGS. 2-4, the increased air flow available due to the increased boost pressure may be advantageously used to purge condensate from CAC 166 to the engine intake. Valve 142 in conduit 140 may be opened to route the extra air flow back to the intake upstream of compressor 162 to maintain a level of requested torque. Further, adjustments to throttle 62 and/or spark timing adjustments may be used to maintain torque during the purging. Further still, increasing alternator loading may provide torque compensation. Vehicles with electric machines (e.g., hybrid vehicles) may be able to increase alternator to a greater degree as they may have a larger operating range.

Returning to FIG. 1, in some examples, storage medium read-only memory 106 may be programmed with computer readable data representing instructions executable by microprocessor unit 102 for performing the methods described below as well as other variants that are anticipated but not specifically listed. An example method is described herein with reference to FIG. 3.

Figure 2:
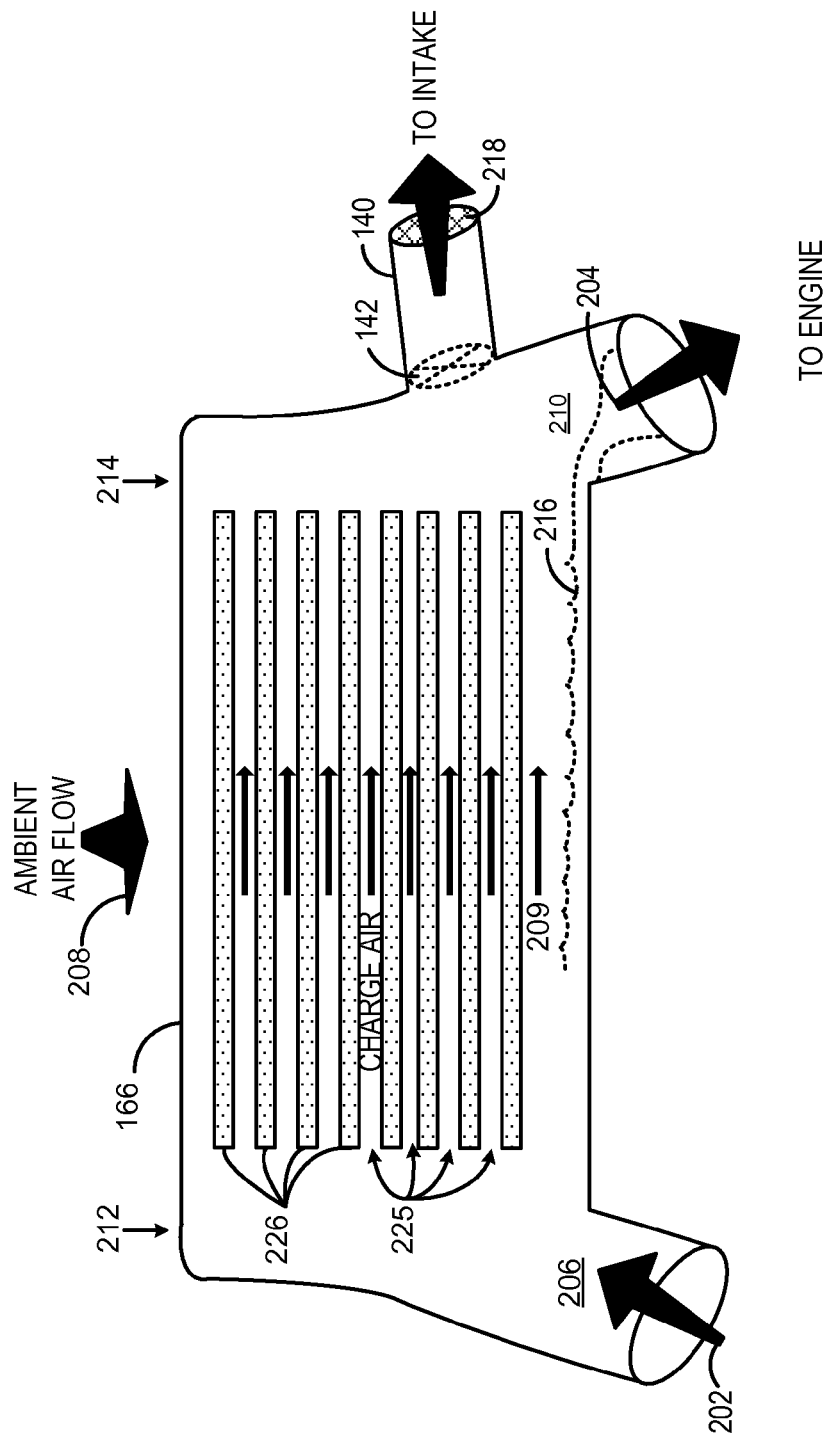
FIG. 2 shows a schematic diagram of the charge air cooler of FIG. 1.

Referring now to FIG. 2, an embodiment of CAC 166 is illustrated. FIG. 2 shows a front perspective view CAC 166. CAC 166 includes multiple air outlets, including conduit 140 leading to the intake passage upstream of a compressor. Increased boost pressure may be utilized to discharge condensate from the charge air cooler which may accumulate as the result of the high ambient air humidity. This may occur, for example, on surfaces of heat exchange passages within the charge air cooler when the surfaces are at a temperature less than the dew point of the ambient air entering the cooler. When condensation forms on these cooler surfaces it may pool at a low point of the charge air cooler, for example.

As shown in FIG. 2, the direction of engine air flow entering CAC 166 is indicated generally by arrow 202, and engine air flow exiting charge air cooler 166 is indicated generally by arrow 204. However, it will be appreciated that engine air may enter and exit charge air cooler 166 at other air flow directions and the engine air flow as indicated by arrows 202 and 204 is provided as one non-limiting example. Likewise, other charge air cooler geometries than those depicted in FIG. 2 are possible without departing from the scope of this disclosure.

As introduced above, engine air may enter via a first engine air passage 206 upstream from CAC 166. First engine air passage 206 may be coupled to an inlet region (e.g., inlet tank) of CAC 166. The inlet region may be fluidically coupled to a plurality of heat exchange passages 225. Engine air may then be cooled via heat exchange with ambient air, indicated generally at 208, and may then exit via a second engine air passage 210 downstream from CAC 166. Second engine air passage 210 may be coupled to an outlet region (e.g., outlet tank) of CAC 166. The outlet region may also be fluidically coupled to the plurality of heat exchange passages. In other words, engine air enters at a hot side 212 of the charge air cooler and exits at a cold side 214 of the charge air cooler (directionality of charge air flow indicated generally by arrows 209), wherein 'hot' and 'cold' indicate a relative temperature of the engine air as it passes through the charge air cooler. In this way, ambient air 208 cools compressed engine air via heat exchange as the engine air passes through the charge air cooler. However, the compressed engine air entering the charge air cooler may condense, as described above. In this sense, first engine air passage 206 may deposit condensate within the charge air cooler.

As shown, CAC 166 may include a plurality of heat exchange passages 225 and a plurality of ambient air passages 226. Heat exchange passages 225 may provide a conduit for charge air to be cooled by ambient air cross-flow passing through the plurality of ambient air passages 226. In this way, compressed engine air is cooled upstream from the combustion chambers.

Accumulated condensate 216 may pool at a low point of charge air cooler 166, such as along the bottom surface of charge air cooler. Accumulated condensate 216 may also pool along surfaces of the heat exchange passages 225. Under certain conditions, such as during a tip-in event, the accumulated condensate 216 may be swept out of the charge air cooler 166 via the second air passage 210, as shown by the dotted lines. If a relatively long amount of time elapses between tip-in events, the amount of accumulated condensate may be large enough to cause combustion issues if the accumulated condensate reaches the engine.

To prevent a slug of condensate from reaching the engine, a proactive clean-out cycle may be activated under certain conditions. For example, if the engine has been operated for a given duration of time without reaching a threshold air flow, the clean-out cycle may be initiated. In one example, if the engine has been operated for 20 minutes without reaching 12 lbs/min of air flow, the clean-out cycle is initiated. The clean-out cycle includes increasing air flow through the charge air cooler without directing excess air through the throttle body to the engine. To increase engine air flow, a wastegate valve (such as wastegate 171 of FIG. 1) may be closed, increasing boost pressure and air flow through the charge air cooler.

To maintain requested torque during the clean-out cycle, CAC 166 includes a conduit 140 coupled to the intake passage upstream of the compressor. A valve 142 in conduit 140 may be opened to selectively route a portion of intake air back to the intake passage. Thus, during the clean-out cycle, intake air may be routed from the CAC 166 to both the intake manifold engine, via the second air passage 210, and the intake passage upstream of the compressor, via conduit 140.

In order to prevent condensate from reaching the intake passage and the compressor, conduit 140 may be coupled to CAC 166 at a position that is higher than second air passage 210 relative to vehicle ground. In this way, accumulated condensate, which is likely to pool at low spots in CAC 166, will be preferentially swept to the engine via the second air passage 210. However, conduit 140 may be coupled to CAC 166 at other locations. Further, a dispersion element 218 may be positioned in conduit 140 to break up any large droplets of condensate. Dispersion element 218 may be a screen, plurality of slats, baffle, or other configuration.

It will be appreciated that the above description is non-limiting and components of the CAC 166 may be of other suitable geometric configurations than those depicted in FIG. 2. Additionally, it will be appreciated that features of CAC 166 may embody configurations other than those depicted without departing from the scope of this disclosure. For example, valve 142 may be positioned in virtually any location within conduit 140 or within the outlet tank of the charge air cooler.

Thus, the systems presented with respect to FIGS. 1 and 2 provide for a charge air cooler having an inlet region fluidically coupled to a plurality of heat exchange passages and an outlet region fluidically coupled to the heat exchange passages, a conduit fluidically coupling the outlet region to an intake passage upstream of a compressor, and a controller with instructions to open a valve positioned in the conduit during select conditions. The controller may include instructions to close a turbine wastegate during the select conditions.

The select conditions may comprise mass air flow being below a threshold for a threshold amount of time. In other embodiments, the select conditions may comprise an amount of accumulated condensate in the charge air cooler being above a threshold. The amount of accumulated condensate may be estimated based on mass air flow, ambient temperature, charge air cooler outlet temperature, and charge air cooler pressure.

The system may further comprise a dispersion element positioned in the conduit, and/or an air passage coupled to the outlet region of the charge air cooler and leading to an intake manifold of the engine. The conduit may be coupled to the outlet region of the charge air cooler at a location higher than the air passage relative to vehicle ground.

Figure 3:
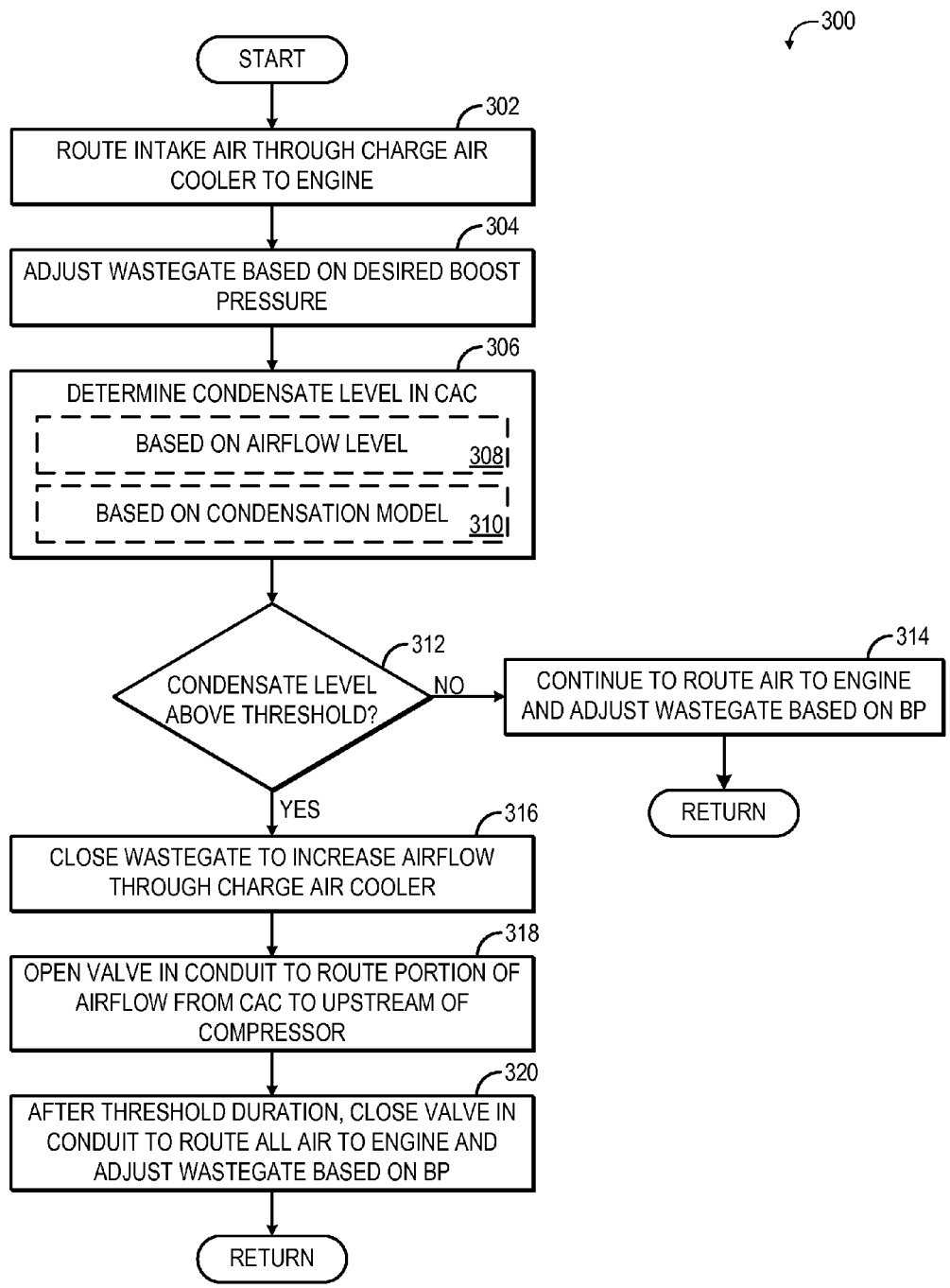
FIG. 3 is a flow chart illustrating a method for performing a charge air cooler clean-out cycle according to an embodiment of the present disclosure.

Turning now to FIG. 3, a method 300 for performing a charge air cooler clean-out cycle is presented. Method 300 may be carried out by an engine controller, such as controller 12, according to instructions stored thereon. The clean-out cycle may be initiated in response to a level of condensate in a charge air cooler (e.g., CAC 166). Performing the clean-out cycle may include adjusting a turbocharger wastegate, such as wastegate 171, and opening a valve in a conduit coupling the charge air cooler to an intake passage of the engine upstream of a turbocharger compressor (e.g., opening valve 142 in conduit 140).

At 302, method 300 includes routing intake air through the charge air cooler to the engine. Prior to performing the clean-out cycle, all the intake air from the charge air cooler may be routed to the engine. This includes the valve 142 in the conduit 140 coupling the charge air cooler to the intake passage upstream of the compressor being closed. At 304, the wastegate is adjusted based on desired boost pressure. For example, the wastegate position may be adjusted to deliver a desired amount of boost based on engine conditions, such as speed and load, and/or adjusted to prevent turbocharger surge.

At 306, the condensate level of the charge air cooler is determined. The condensate level of the charge air cooler may be determined in a suitable manner. For example, as indicated at 308, the condensate level may be inferred based on the level of air flow traveling through the charge air cooler. If the air flow is relatively small or slow, condensate may be allowed to accumulate in the charge air cooler. In another example, the condensate level may be determined based on a condensation model, as indicated at 310.

The model may estimated a rate of condensate accumulation, and may include inputs of ambient temperature, charge air cooler outlet temperature, mass air flow, exhaust gas recirculation (EGR) flow (if the engine includes an EGR system), charge air cooler pressure, and humidity. If the humidity is not known (for example, if the engine does not include a humidity sensor), the humidity may be set to 100%. The ambient temperature and humidity may provide an indication of the dew point of the intake air, which may be further affected by the amount of EGR in the intake air (e.g., EGR may have a different humidity and temperature than the air from the atmosphere). The difference between the dew point and the charge air cooler outlet temperature indicates whether condensation will form within the cooler, and the mass air flow may affect how much condensation actually accumulates within the cooler.

A simpler mechanism for determining a condensate level may include a condensate level that is mapped to charge air cooler outlet temperature and engine load or charge air cooler pressure. Engine load may be a function of air mass, torque, accelerator pedal position, and throttle position, and thus may provide an indication of the air flow velocity through the charge air cooler. For example, a moderate engine load combined with a relatively cool charge air cooler outlet temperature may indicate a high condensate level, due to the cool surfaces of the charge air cooler and relatively low intake air flow velocity. The map may include a modifier of ambient temperature.

At 312, it is determined if the condensate level is greater than a threshold. If the condensate level is inferred based on air flow, as indicated at 308, the condensate level may exceed the condensate threshold when air flow has remained below a threshold air flow for a given duration. For example, during vehicle engine operation where the vehicle is driven on a flat surface, the air flow may remain below a threshold air flow, such as 12 lbs/min. Above this threshold air flow, the condensate may be swept to the engine, but below the threshold, the condensate may accumulate in the charge air cooler. After a given duration, such as 40 minutes, if the condensate is rapidly swept to the engine, such as during a tip-in event, misfire or other combustion issues may occur. Thus, the condensate level may be above the threshold, and hence the clean-out cycle may be proactively performed, if the engine is operated for 40 minutes with air flow below 12 lbs/min. Further, engine load may affect the time duration, as greater condensate may accumulate when the engine is operated at higher load. For example, if the engine is operating with higher load (due to the vehicle pulling a trailer, for example), the time duration may be shortened to 20 minutes.

If the condensate level is determined based on the condensation model, as indicated at 310, the amount and/or rate of accumulated condensate may be compared to a threshold condensate amount. In some embodiments, the threshold may be a threshold above which condensation forms and below which condensation does not form. In this way, any indication of condensation may be above the threshold. However, in other embodiments, the threshold may be set such that a small amount of condensate is allowed to accumulate.

If the condensate level is not above the threshold, method 300 proceeds to 314 to continue to route air flow from the charge air cooler to the engine and adjust wastegate position based on desired boost pressure. If the condensate level is above the threshold, method 300 proceeds to 316 to close the wastegate to increase boost pressure and the amount of air flow traveling through the charge air cooler. The air flow may be increased greater than an amount requested by a vehicle operator. By increasing air flow through the charge air cooler, accumulated condensate may be swept to the engine. The wastegate may be fully closed, or it may be adjusted to a partially closed position. The position of the wastegate may be determined based on the level of condensate in the charge air cooler, e.g., if the condensate level is higher, the wastegate may be closed more than if the level is lower. Conversely, if the condensate level is higher, the wastegate may be closed by a smaller amount than if the condensate level is lower, to allow for a more gradual removal of the condensate.

At 318, the valve in the conduit coupled to the charge air cooler is opened to route a portion of the intake air from the charge air cooler back to the intake passage upstream of the compressor. In this way, the extra air flow through the charge air cooler is routed back to the compressor instead of being routed to the engine. Thus, the amount of air delivered to the engine may be maintained to deliver requested torque, reducing torque disturbances resulting from the increased air flow through the charge air cooler. In some embodiments, throttle position and/or spark timing may be adjusted to control torque. For example, spark may be advanced to maintain torque.

At 320, after a threshold duration has elapsed (e.g., 3 seconds), method 300 includes closing the valve in the conduit to prevent the air from the charge air cooler from being routed back to the intake passage. Thus, all the air from the charge air cooler is routed to the engine. The wastegate position may then be controlled based on desired boost pressure. Method 300 then returns.

Thus, method 300 of FIG. 3 provides for performing a clean-out cycle of a charge air cooler when mass air flow through the charge air cooler and into the engine remains below a threshold for a given duration. To perform the clean-out cycle, boost pressure may be increased by closing a turbocharger wastegate, thus increasing air flow through the charge air cooler. To maintain driver-requested torque, a portion of air flow from the charge air cooler may be routed back to the intake upstream of the compressor via a conduit fluidically coupling an outlet of the charge air cooler to the intake passage upstream of the compressor. A valve positioned in the conduit or at the junction of the conduit and the charge air cooler outlet may be opened to route the air back to the compressor.

Figure 4:
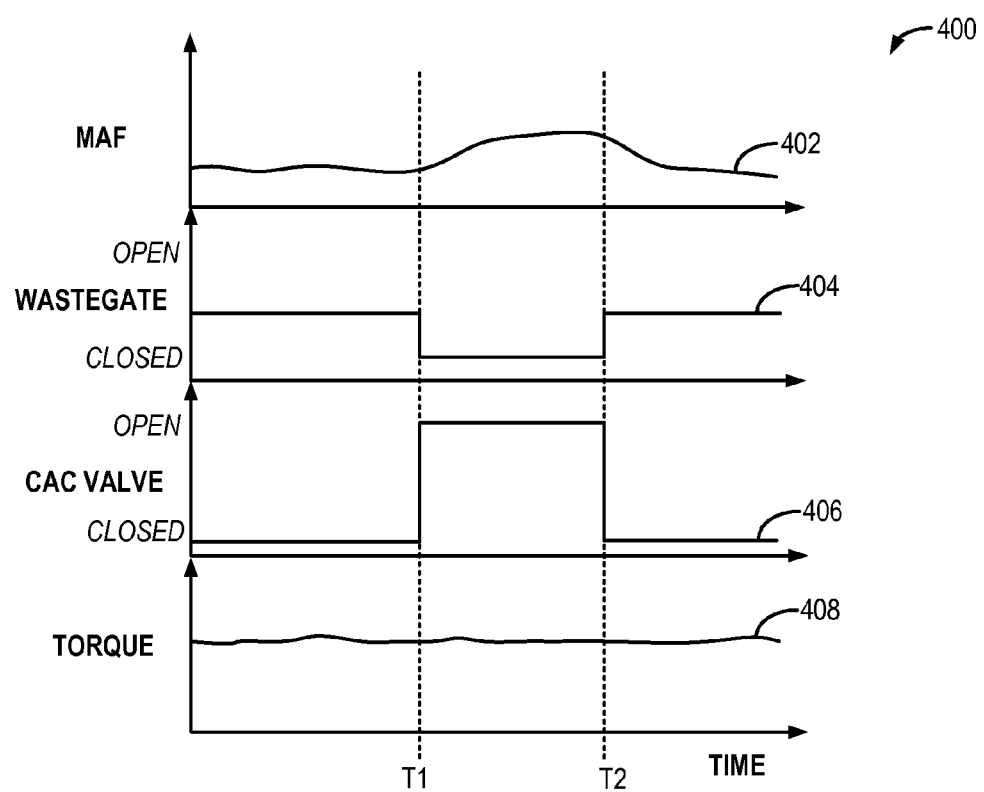
FIG. 4 is a diagram illustrating example engine operating parameters during a charge air cooler clean-out cycle.

FIG. 4 is a diagram 400 illustrating example engine operating parameters during a charge air cooler clean-out cycle. Specifically, mass air flow (MAF), wastegate position, charge air cooler valve position (e.g., the position of valve 142 controlling conduit 140), and torque are depicted. For each operating parameter, time is depicted along the horizontal axis and values of the respective operating parameters are depicted along the vertical axis.

Prior to time t1, the engine is operating at relatively steady torque and MAF, as illustrated by curves 408 and 402, respectively. The vehicle in which the engine is operated may be traveling on a relatively flat surface, for example. The MAF may be below a threshold MAF, such as 12 lbs/min. If the MAF remains below the threshold MAF for a threshold amount of time, such as 30 minutes, a clean-out cycle may be initiated to remove any accumulated condensate from the charge air cooler.

As shown in FIG. 4, the engine has been operated with MAF below the threshold for a threshold amount of time at time t1. Thus, at time t1, the clean-out cycle is initiated by closing the wastegate, illustrated in curve 404. The closed wastegate increases boost pressure and increases the MAF through the charge air cooler. Prior to time t1, the wastegate may be adjusted based on desired boost pressure, and may be partially opened, as illustrated, or fully opened. However, if the wastegate is fully closed prior to time t1, the clean-out cycle may be initiated by adjusting throttle position, for example, or the clean-out cycle may not be carried out.

In order to maintain the driver-requested torque, the charge air cooler valve may be opened at time t1, as illustrated by curve 406. By opening the charge air cooler valve, a portion of the air flow from the charge air cooler is routed back to the compressor. Thus, as shown in curve 408, torque is maintained even with the increased MAF during the clean-out cycle. If indicated, torque may be further maintained by adjusting spark timing and/or throttle position.

At time t2, the clean-out cycle ends and the wastegate is returned to a position determined based on desired boost pressure (such as partially open, as illustrated), and the charge air cooler valve is closed. MAF then decreases. The clean-out cycle may be performed for a fixed duration, such as 3 seconds, or it may be performed for a duration that is dependent on the estimated amount of condensate in the charge air cooler, MAF increase during the clean-out cycle, etc. Further, in some embodiments, a humidity sensor may be positioned in the intake downstream of the charge air cooler, and the clean-out cycle may be performed until the humidity sensor indicates all the condensate has been removed from the charge air cooler. Thus, the systems and methods described herein provide for a method for a charge air cooler, comprising responsive to a condensate level in the charge air cooler, increasing boost pressure and maintaining a requested level of torque by routing a portion of air flow exiting the charge air cooler to an intake passage upstream of a compressor. The increasing boost pressure may be responsive to the condensate level in the charge air cooler being greater than a threshold condensate level. The condensate level being greater than the threshold condensate level may be estimated based on mass air flow being below a threshold for a given duration. In another example, the condensate level may be determined based on mass air flow, ambient temperature, charge air cooler outlet temperature, and charge air cooler pressure.

Increasing boost pressure may further comprise closing a wastegate valve of a turbine coupled to the compressor, and routing a portion of air flow exiting the charge air cooler to the intake passage upstream of the compressor may further comprise opening a valve positioned in a conduit fluidically coupling an outlet of the charge air cooler to the intake passage upstream of the compressor. The method may further comprise advancing spark timing responsive to the increased boost pressure to maintain the requested level of torque.

In another example, a method for an engine comprises if a charge air cooler condensate level is below a threshold, routing air through a charge air cooler to the engine to deliver a requested amount of torque, and if the charge air cooler condensate level is above the threshold, increasing air flow greater than requested by a vehicle operator through the charge air cooler while maintaining torque by routing at least part of the air from the charge air cooler to upstream of a compressor.

The charge air cooler condensate level may be estimated based on mass air flow, ambient temperature, charge air cooler outlet temperature, and charge air cooler pressure in one example. In another example, the charge air cooler condensate level may be estimated based on mass air flow over a given duration. Increasing the air flow through the charge air cooler may further comprise closing a wastegate of a turbine coupled to the compressor, and routing at least a portion of the air from the charge air cooler to upstream of the compressor may further comprise opening a valve positioned in a conduit coupling the charge air cooler to an intake passage upstream of the compressor. The method may further comprise adjusting throttle position when the charge air cooler condensate level is above the threshold to maintain torque.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a charge air cooler, comprising:
responsive to a condensate level in the charge air cooler being greater than a threshold condensate level, increasing boost pressure and maintaining a requested level of torque by routing a portion of air flow exiting the charge air cooler to an intake passage upstream of a compressor.

2. The method of claim 1, further comprising determining the condensate level in the charge air cooler via an electronic controller, and wherein the increasing boost pressure and maintaining the requested level of torque responsive to the condensate level in the charge air cooler being greater than the threshold condensate level comprises increasing boost pressure and maintaining the requested level of torque via the electronic controller.

3. The method of claim 2, wherein the condensate level being greater than the threshold condensate level is estimated via the electronic controller based on mass air flow being below a threshold for a given duration.

4. The method of claim 2, wherein the condensate level is determined via the electronic controller based on mass air flow, ambient temperature, charge air cooler outlet temperature, and charge air cooler pressure.

5. The method of claim 2, wherein increasing boost pressure via the electronic controller further comprises closing a wastegate valve of a turbine coupled to the compressor via the electronic controller.

6. The method of claim 1, wherein routing a portion of air flow exiting the charge air cooler to the intake passage upstream of the compressor further comprises opening a valve positioned in a conduit fluidically coupling an outlet of the charge air cooler to the intake passage upstream of the compressor.

7. The method of claim 1, further comprising advancing spark timing responsive to the increased boost pressure to maintain the requested level of torque.

8. A method for an engine, comprising:
if a charge air cooler condensate level is below a threshold, routing air through a charge air cooler to the engine to deliver a requested amount of torque; and
if the charge air cooler condensate level is above the threshold, increasing air flow greater than requested by a vehicle operator through the charge air cooler while maintaining torque by routing at least part of the air flow from the charge air cooler to upstream of a compressor.

9. The method of claim 8, further comprising determining the condensate level in the charge air cooler via an electronic controller, and wherein increasing air flow greater than requested by the vehicle operator through the charge air cooler further comprises closing a wastegate of a turbine coupled to the compressor via the electronic controller.

10. The method of claim 9, wherein the charge air cooler condensate level is estimated via the electronic controller based on mass air flow over a given duration.

11. The method of claim 9, wherein the charge air cooler condensate level is estimated via the electronic controller based on mass air flow, ambient temperature, charge air cooler outlet temperature, and charge air cooler pressure.

12. The method of claim 8, wherein routing at least a portion of the air from the charge air cooler to upstream of the compressor further comprises opening a valve positioned in a conduit coupling the charge air cooler to an intake passage upstream of the compressor.

13. The method of claim 8, further comprising adjusting throttle position when the charge air cooler condensate level is above the threshold to maintain torque.

14. A system, comprising:
a charge air cooler having an inlet region fluidically coupled to a plurality of heat exchange passages and an outlet region fluidically coupled to the plurality of heat exchange passages;
a conduit fluidically coupling the outlet region to an intake passage upstream of a compressor; and
a controller with instructions to open a valve positioned in the conduit in response to select conditions including an amount of accumulated condensate in the charge air cooler being above a threshold.

15. The system of claim 14, wherein the controller includes instructions to close a turbine wastegate during the select conditions.

16. The system of claim 14, wherein the amount of accumulated condensate being above the threshold is determined by the controller based on mass air flow being below a threshold for a threshold amount of time.

17. The system of claim 14, wherein the amount of accumulated condensate is estimated based on mass air flow, ambient temperature, charge air cooler outlet temperature, and charge air cooler pressure.

18. The system of claim 14, further comprising a dispersion element positioned in the conduit.

19. The system of claim 14, further comprising an air passage coupled to the outlet region of the charge air cooler and leading to an intake manifold of an engine, wherein the conduit is coupled to the outlet region of the charge air cooler at a location higher than the air passage relative to vehicle ground.

* * * * *